United States Patent
Tartivita

(10) Patent No.: US 10,269,506 B1
(45) Date of Patent: Apr. 23, 2019

(54) MAXIMAL MODIFIABLE MODULAR CAPACITOR GENERATOR (CAPGEN)

(71) Applicant: Santo Romano Tartivita, Atlantic Highlands, NJ (US)

(72) Inventor: Santo Romano Tartivita, Atlantic Highlands, NJ (US)

(*) Notice: Subject to any disclaimer, the term of this patent is extended or adjusted under 35 U.S.C. 154(b) by 356 days.

(21) Appl. No.: 13/986,843

(22) Filed: Jun. 10, 2013

(51) Int. Cl.
*H01G 11/42* (2013.01)
*G21H 1/00* (2006.01)
*H01G 9/004* (2006.01)

(52) U.S. Cl.
CPC ........... *H01G 11/42* (2013.01); *G21H 1/00* (2013.01); *H01G 9/004* (2013.01)

(58) Field of Classification Search
CPC . H01G 11/42; H01G 2/10; H01G 4/28; H01G 4/30
USPC .................................. 361/326, 503
See application file for complete search history.

(56) References Cited

U.S. PATENT DOCUMENTS

| | | | |
|---|---|---|---|
| 2,926,268 A | | 2/1960 | Raymond |
| 3,089,195 A | | 5/1963 | Woodburn, Jr. et al. |
| 4,953,057 A | * | 8/1990 | Davidian ............... 361/279 |
| 5,600,534 A | * | 2/1997 | Blazek et al. ........... 361/502 |
| 6,181,545 B1 | | 1/2001 | Amatucci et al. |
| 6,245,313 B1 | | 6/2001 | Suzuki et al. |
| 6,353,528 B1 | | 3/2002 | Hori et al. |
| 6,787,235 B2 | | 9/2004 | Carl et al. |
| 7,466,536 B1 | | 12/2008 | Weir et al. |
| 2012/0250224 A1 | * | 10/2012 | Guerin et al. ........... 361/502 |

OTHER PUBLICATIONS

"Waste Not" by Van Snyder, Scientific American, Feb. 2012 $2^{nd}$ Ed p. 6 Manual of Roetgenological Technique, L.R. Sante.

* cited by examiner

*Primary Examiner* — Sharon M Davis

(57) ABSTRACT

A maximal modifiable modular capacitor-generator (CAPGEN) architecture, dielectrics and electrodes may be modified and retain substantially all of the starting activated carbon powder surface area by encapsulating the activated carbon powder in a modifiable gaseous medium and pressure. The capacitor electrical conductivity may be further increased and resistance reduced by electrically reticulating the electrodes and/or modifying the carbon electrode with rarefied or pressurized gases, conventional electrolytes, radioisotopes, stratified radiation emitting materials such as gases, liquids, solids, or modified photovoltaic carbon powder, thereby the capacitor becomes self charging and the surface area, mass, voltage, capacitance, energy density, power density and working temperature are maximized so that the same capacitor base architecture may be maximally modified from a capacitor to a CAPGEN, to a photovoltaic-thermionic CAPGEN and helium generator.

14 Claims, 1 Drawing Sheet

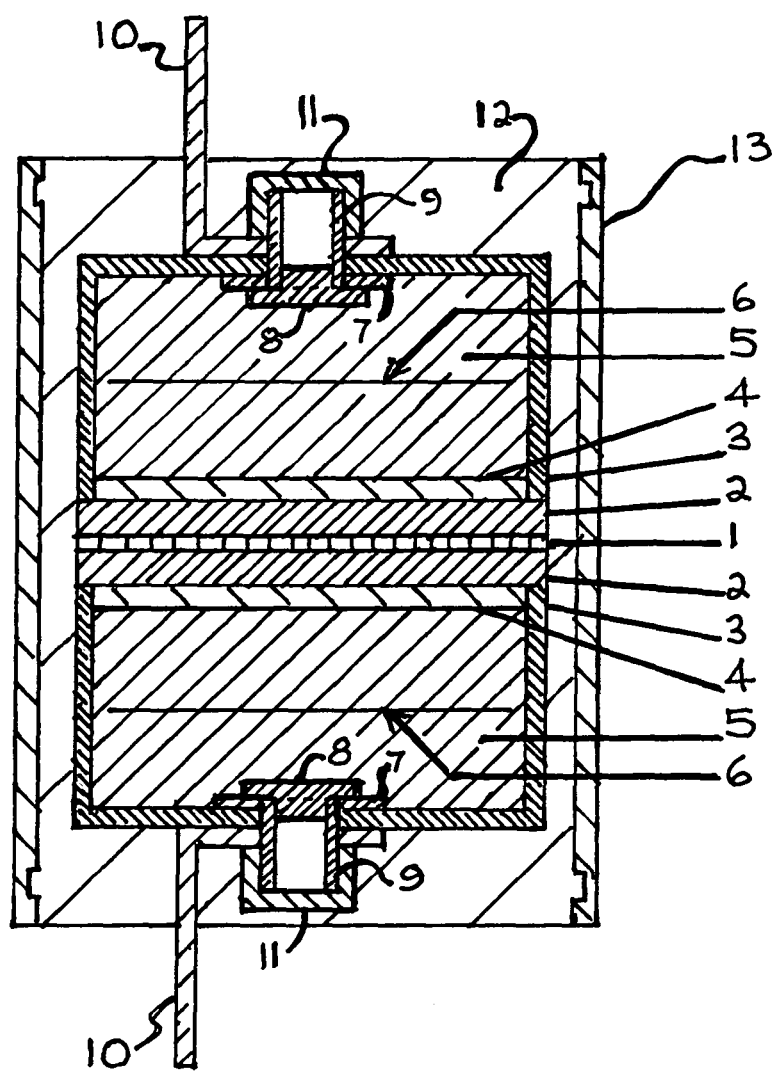

MAXIMAL MODIFIABLE MODULAR CAPACITOR GENERATOR (CAPGEN)

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The object of this invention is to create a modifiable modular capacitor-generator (CAPGEN) base architecture capable of directly converting and storing a multitude of energies; i.e. 1. (VACUA) V power, gases, space photons, spent nuclear fuels, thermionic heat, electrolytes etc. 2. replace a multitude of conventional batteries with low voltage and high capacitance per Kg, 3. replace a multitude of conventional capacitors with high voltage and low capacitance per Kg, 4. combine capacitors best quality (power density) with batteries best quality (energy density) in a single new modifiable modular CAPGEN architecture with revolutionary electrolytes, massive electrodes, 5. new methods to increase electrical conductivity and reduce electrical resistance, 6. generates its own primary and secondary electrical charges from an imbedded radiation source, and external radiation source, 7. stores its own electrical charges, 8. The same CAPGEN may be charged by an external electromotive force.

In general, capacitors that utilize carbon powders as electrodes to store electrical energy require the carbon powder to be mixed with binders to form a paste, keep a shape and be structurally self-supporting. When nonconductive binders are mixed with carbon powders to form carbon electrodes in a capacitor, the capacitor internal electrical resistance increases and the capacitor efficiency decreases. When conductive binders (electrolytes) are used as binders to form carbon electrodes, the capacitor internal electrical resistance decreases and the capacitance increases but the working voltage and amperage are severely limited. Carbon electrodes that are made to shape are described in U.S. Pat. No. 3,089,195; therein raw carbon compounds are mixed with catalyzed thermoset furfurral resin and molded into a form, the electrodes are cured then baked to about 1000° F., thereafter the baked electrodes surface pores are filled, in vacuum, with catalyzed furfurral resin and cured, then the cured articles are graphatized in partially controlled atmospheric pressure at temperatures between 4600 to 5000° F. To produce the above carbon articles extremely high temperatures must be used at a high cost in energy and labor. When graphite products described above are made into electrodes in capacitors to store electrical energy the graphite surface area is limited to about 500 sq.ft./cm³. This graphite surface area is not sufficient for the present invention.

Capacitors that utilize "glassy" carbon as electrodes to store electrical energy are described in U.S. Pat. No. 6,245,313B1. Therein glassy carbon electrodes are made as described in the previous patent, except that instead of raw carbon and furfural resin, polymerizable resins are used with a catalyst to form shaped electrodes, curing the electrodes and then the cured electrodes are baked at about 1300° C. Thereafter the electrode's pores are filled as described above and rebaked at 1700° C. to obtain glassy carbon electrodes. Glassy carbon electrodes have better structural characteristics but require conventional electrolytes to enhance the electrode's capacitance thereby severely limiting the charging voltage.

Conventional capacitors that utilize electrolytes (such as lithium Li) to obtain high capacitance are described in U.S. Pat. No. 6,181,545 B1. High capacitance as described therein is achieved at the expense of limiting the working voltage between 0-2.5V. The low voltage severely limits the electrical storage capacity of the capacitor. Other conventional capacitors that utilize liquid electrolytes to obtain a capacitance as high as 86 F/g are described in U.S. Pat. No. 6,353,528 B1. The high capacitance as described there in is substantially achieved by testing the capacitor's electrodes in 33% aqueous sulfuric acid solution. However, high capacitance was achieved at the expense of limiting the working voltage to 0.9V and the current density to 300 mA/cm². According to their Example 2, Table 4, activated carbon powder with an average starting surface area of 2000 m²/g was used for 22 carbon electrode samples. After the carbon electrodes were compacted the actual average working specific surface area for the 22 samples (calculated) decreased to 1385 m²/g. The table also shows that: 1. The capacitance decreases as the apparent density g/cm³ increases. The capacitance decreases as the electrodes specific surface area m²/g decreases.

According to their Table 18, the capacitance generally decreases as the activated carbon pores volume of ≤15 A° decreases from a high of 88% to a low of 53.9%. The above data also shows that self-supporting structural carbon electrodes;

1. With compaction the surface area may decrease to below 70% of the starting surface area.
2. The capacitance is greater with low density carbon powder.
3. The capacitance is greater when carbon has a higher specific surface area.
4. The capacitance is greater when the carbon powder porosity is maximized.
5. Capacitance is directly proportional to the number of positive and negative ions that react with and are adsorbed by the activated carbon atoms-molecules.
6. Capacitance is proportional to the internal electrical resistance.

A conventional capacitor that utilizes high voltage (3500V) with no electrolytes is described in U.S. Pat. No. 7,466,536 B1. The high working voltage in the above patent is made possible due to the ceramic dielectric matrix composed of modified barium titanate powders and poly (ethylene terephthalate) plastic. Ceramic dielectric materials of this type are extremely fragile due to the dielectric thinness, thermal stress and expansion-contraction cycles, therefore each capacitor in the above patent was limited to an area of only 0.5806 cm². To store 52.22 Kwh of electrical energy 31,351 components were assembled together, but each component is made up of ten elements and each element contains 100 capacitors for a total of 31,351,000 capacitors with a total weight of 281.56 pounds. It is problematic that 31,331,000 extremely thin ceramic capacitors at 3500V can function for years without degradation and malfunction and that damaged capacitors can be located and repaired economically.

An example of an ultracapacitor (also known as electrical double layer capacitor) with carbon electrodes and no binders is described in U.S. Pat. No. 6,787,235 therein a carbon material is consolidated (solidified) at high temperature and compression. The capacitor electrodes (billets) are processed by using hot isostatic pressing (HIPing) in a "specifically constructed vessel". A capacitance of 53 F/g is obtained by using an aqueous electrolyte (30% sulfuric acid) at 3V. The maximum energy density is 28 wh/kg. According to their Table 1, when the activated carbon material is solidified at 800° C. and 3000 psi, it looses (calculated) approximately 11.6% of the starting surface area and looses 33.5% of the starting surface area when it is compressed at 25,000 psi. According to their Table 2 the carbon density and conductivity. increase with higher compression.

According to their Table 4, example 1, when the ultracapacitor was tested at 1.0V and compressed at 3000 psi, the capacitance was 212 F/g, and 20 F/g when the capacitor was compressed at 21,000 psi.

According to their Table 6, when the ultracapacitor with organic electrolyte was compressed at 3000 psi and tested for one hour at 3V the energy density was 28 wh/kg and when the test was performed at 2.8 V the energy density was 24.6 wh/kg (by their estimate). Their data shows that as solid carbon electrodes become more dense the conductivity increases but the carbon internal surface area and energy density decrease dramatically. A significant factor is that conventional electrolytes limit the test voltage to 3V and a small change in charge from 3V to 2.8V severely decreases the capacitor's energy density. It is the opinion of this author that the controlling factor in storing large amounts of electrical energy in capacitor-battery (CAPBAT) is voltage and conventional electrolytes limit the voltage potential and therefore limit the CAPBAT overall potential.

For decades patents have been issued to convert radiation into usable electricity. The patents vary from atomic power plants to photovoltaic cells. However, to date there is not a radiation conversion system that generates sufficient power that is economical, portable and can power an automobile for a few miles.

Betavoltaic and alphavoltaic cells developed to date generally use semiconductor technology whereby a substrate (silicon) flat or perforated supports a radioactive material thereby electrons are emitted from the silicon opposite surface. An external circuit serves to conduct electrons away from the cell.

An example of transforming radiation to electricity is found in U.S. Pat. No. 2,926,268. Therein strontium 90 ($^{90}$St) was used in a self discharge vacuum tube to generate electricity by bombarding a silicon wafer (a semiconductor) on one side, the excited silicon wafer emits electrons on the opposite side and onto an anode collector, thereby an electrical direct current is generated. Claims were made that a millionth watt was generated from the radiation-silicon wafer.

Some of the severe limitations of vacuum tube technology are:
1. The generated electrical power has to be used as it is produced or an external source must be utilized to store the generated electrical energy.
2. The power generated is useful for extremely small appliances where wattage is extremely limited.
3. Emitted usable radiation is unidirectional and limited to a fraction of the emitted circumferential radiation area.
4. Radioisotopes are substantially exposed to the environment or if they are insulated the insulation volume and weight may be greater than the cell itself.
5. Emitted radiation utilization is limited to a single silicon stratum.
6. Individual cells cannot be stacked in quantity due to internal radiation absorption by the substrates and internal heat build-up.
7. There are no means to utilize or remove the internal evolved heat.

It is clear that when semiconductor materials are used as a supplementary source to radioisotopes to generate an electrical current the radiation source must penetrate the silicon wafer, as a result the semiconductor structure degrades by heat build-up and fatigue.

According to Wickpedia, most advanced electrical generators used by the United States Government in their space satellites use emitted heat from radioisotopes as the energy source.

Generally, thousands of thermocouples are assembled in series and/or in parallel to convert the emitted radioisotope radiation (heat) into electrical energy.

Some of the limiting factors to generate greater electrical current output from this technology and to be used for general purposes are:
1. Electric energy is generated by thermionic (heat) emission only.
2. The total energy is limited to a few hundred watts.
3. Due to hundreds or thousands of thermocouples connected in series, electrical resistance increases limiting the electrical output.
4. Since the thermocouples are metallic, their combined weight becomes burdensome.
5. To assemble the thermocouples multitude it becomes cumbersome and time consuming.
6. The cost per watt is prohibitive for most practical uses.

In general, water-cooled nuclear power plants generate electricity by heating water to steam that turns a turbine and an electrical generator. By design, uranium fuel rods emit energy at high temperature that must be moderated and controlled at all times by water and graphite. The water, being in proximity to the nuclear fuel, becomes radioactive and a major safety concern.

For safety reasons, the generating plants are located at a considerable distance from the general population. Due to a multitude of systems, such as containment structure, pressurized structure, reactor container, steam generator, steam turbine, condensers, electric generator, pumps, vapor chimney tower, a large supply of water etc. the entire system becomes necessarily complicated, fastidious, expensive and nerve racking to the general public.

Once electricity is generated, approximately 30% of it is wasted in transmission lines before it gets to the consumer. The spent nuclear byproducts become a major problem as to where to store it, how and for how long to store it and for unknown future cost or problems such as decommissioning the entire plant.

For approximately fifty years, an alternate to the water cooled nuclear power plant is the gas cooled nuclear power plant or pebble-bed gas reactor. Helium gas is used in the nuclear reactor as a coolant and to turn a turbine-generator to produce electricity. A pebble-bed gas reactor contains thousands of balls that continuously re-circulate in and out of the nuclear reactor container. Each ball is approximately two (2) inches in diameter and consists of bits of uranium interspersed between thousands of graphite pebbles that are contained within a silicon carbide spherical layer. The silicon carbide sphere is encapsulated in an outer thermally compressed carbon sphere. To date no practical portable pebble-bed gas reactor or nuclear plant exists to generate electricity directly-without moving parts or to propel a motor vehicle a few miles.

According to Scientific American, February 2012 magazine, page 6 "Waste Not?" article, "In roughly 50 years of operation the United States has accumulated about 60,000 metric tons of used nuclear fuel. That is, the waste still contains around 95% of the energy that could have been extracted had the fuel put into the reactor been used properly."

A radical, fundamental change from conventional nuclear power plants' architecture described above is briefly explained herein. Some of the embodiments of the present invention directly adsorb, convert, and store electromagnetic energy and heat emission from nuclear waste directly into electricity and helium gas without moving parts. Nuclear power plants' waste materials currently are stored at great cost, in large water tanks, metal or concrete vaults usually at the same site where they are generated. For far less money, the same wasted materials may, economically and constructively, be used to generate additional clean energy i.e. electricity and helium gas for generations. The embodiments are modifiable and scaleable, relatively easy to assemble and may generate electricity not secluded and concentrated in one site but locally, diluted and made safe to handle.

For example, the emitted energy from an encapsulated radioisotope, alpha, beta, x-ray-gamma rays and heat is directly transformed into electricity and gas simultaneously and stored, by diverse multiple ionizable concentrically strata powders within the same modifiable architectural system.

The present science in CAPBAT does not solve the practical problem of storing sufficient electrical energy to economically propel motor vehicles for long distances per charge and charge the unit in minutes or seconds.

Prior to the present invention, no practical solutions exist in science whereby a single unit battery or capacitor simultaneous generates and stores its own electrical energy.

BRIEF SUMMARY OF THE INVENTION

The present invention, a maximal modifiable modular capacitor generator (CAPGEN) totally adsorbs radiation transformed into vital electrical energy (Tee) as follows. The base architecture, may constitute a fully functionally independent inner infantile capacitor with a perforated dielectric separator bonded between two perforated metal or conductive carbon fiber electrodes. The dielectric separator may be perforated, non-perforated, fibrous, a gas, liquid, porous or solid. The inner capacitor may be sandwiched and bonded between two solid or perforated and filtered metal or conductive carbon fiber canisters' lid electrodes that have built in electrical terminals—filtered air valves and may contain a menu of infinitely modifiable ingredients such as a carbonaceous powder, radioactivated activated carbon powder, reticulated metal grids conductors, rarefied gas vacuum (V)-power, solid, liquid, conventional electrolytes, radioisotopes, stratified powdered materials that emit or absorb energy. A modular canister electrode may substantially be filled with activated carbon powder, graphene, or carbon fibers etc. that is partially compacted but not solidified nor structurally self-supporting so that each carbon particle may be reached by electrolytes and activated to maximize the surface area and capacitance. To increase electrical conductivity and reduce electrical resistance the carbon powder interspatial air may be rarefied and ionized by V power, the electrode may be reticulated by imbedding within the carbon powder electrode grids that divide the canister volume electrically into levels. In another embodiment the canister may be supplemented with beta (electrons) emitting radioisotopes to maximize the internal electrical conductivity, reduce resistance and generate supplementary charges. In yet another embodiment the carbon powder within the canister contains a radioactive alpha and helium ($^4$He) emitting material such as Americium (Am241), or "spent" radioactive materials, or artificially made radioisotopes so that there is a continuous supply of protons (positive charges) thus the capacitor becomes a radiant capacitor generator (CAPGEN). In another embodiment, the capacitor dielectric separator may be sandwiched and bonded directly between two metal canister carbon electrodes to form a non-insulated capacitor. The non-insulated capacitor is suspended inside an exterior case and the space between them is filled with silicon, polymers, ceramic or other insulation matrices. In another embodiment the inner and outer capacitor may be modified to a photovoltaic-thermionic $^4$He CAPGEN. The electrodes exterior may be coated with a photon sensitive and self energized vacuum modified activated carbon powder. The CAPGEN as described above obtains maximal energy density and maximal power density by balancing the capacitor high voltage with high capacitance with preference to higher voltage. In high voltage CAPGENS described herein, the balance is achieved by eliminating both liquid and solid conventional electrolytes used in conventional batteries and capacitors i.e. lithium, sodium, salts, acids, etc. It is a novelty of this invention to use a gas at standard atmospheric pressure (SAP), high pressure or V power as new electrolytes that are neither liquid nor solid but consists of a gas. Gas as an electrolyte may include air, noble gases, radioactive gases, or other gases to generate ions at high voltage and to increase electric current in carbon electrodes used in CAPBAT. It is common knowledge to those familiar with the science of atmospheric pressures, vacuum tube diodes and electric discharge through gases that as the atmospheric pressure between two points rarefies atoms-molecules decrease, ions and electrical conductivity increase and electrical resistance decreases.

To maximize the carbon powder electrodes internal conductivity and reduce internal electric resistance, the atmospheric pressure within the carbon powder electrodes is rarefied to between 0.0001-760 TORR at temperatures between −300° and 1000° C. or more.

In the present invention several embodiments electrolytes consist of gas (air). The sparking voltage of air at standard atmospheric temperature and pressure, 760 TORR, is approximately 3000v.

As the capacitor internal air is rarefied, the capacitor air becomes partially ionized and the sparking voltage decreases in proportion to the decrease of the capacitor internal pressure to a reversal point at about 0.05±TORR and a sparking voltage of approximately 300v. If the air is rarefied below 0.05±TORR, the rarefied gas becomes less conductive.

The number of air atoms-molecules and potential ions contained within the capacitor also decrease in proportion to the rarefied gas pressure. In example 1, an arbitrary sparking voltage was selected as the charging voltage that corresponds to the capacitor rarefied air and contains a proportional approximate number of potential ions at that pressure.

Some of the advantages of using rarefied gas as an electrolyte in CAPBAT include: the working voltage, current, temperature and capacitance may be maximized. Dangerous explosive chemicals such as the halogen elements and alkaline salts, acids etc. are eliminated and since there are no gas forming chemicals (other than those intentionally placed within the carbon electrodes) the CAPBAT may be used at extreme low and high temperatures and voltage. Also the CAPBAT energy density (stored energy) and power density (charge-discharge rate speed) are maximized. The kWh/kg far exceeds all known batteries or capacitors by many factors. Furthermore, the capacitor energy density may be increased facile by increasing the carbon powder electrodes mass, up to 1 kg, 10 kg or more or by increasing the voltage and/or the number of ions within the electrolyte. Also, the absence of conventional electrolytes extends the capacitor's working life many times over conventional capbats. The fabrication methods and materials for the basic embodiments are simple and economical. The CAPBAT may be modified into a CAPGEN or into a photovoltaic CAPGEN that is self-energized with radiant emitting particles.

In some cases where high capacitance and low voltage capbats are required, the carbon electrodes internal powder may be encapsulated in 0-40% or more conventional solid or liquid electrolytes i.e.: lithium (Li) solution etc. or acids, such as sulfuric acid or chlorine, fluorine, bromine, iodine compounds etc. Thereby, maximal capacitance is obtained at the expense of limiting the working voltage to approximately 0-5V.

It is a novelty of this invention that the same base capacitor architecture as shown in Drawing 1/1 may be modified into various capacitors-capgens with increasing self-charging potential per kg. The following is a partial list of modified capacitor-capgens.

A maximal modifiable modular capacitor-generator (CAPGEN) base architecture (MMM-CAPGEN-BA);

An automatic temperature-pressure variable-vacua power capacitor (AT-PV-VPCAP) modular capacitor;

A reticulated-capacitor (R-CAP);

A selective-vacua power capacitor (S-VPCAP);

A self-charging-single canister-thermionic radiant maximal electrical generator and adsorber (SC-SCAN-TRAMEGA) CAPGEN;

A self-charging-double canister-tramega and helium generator (SC-DCAN-TRAMEGA-$^4$He) CAPGEN;

A photovoltaic-selfcharging-inner capacitor-tramega and helium ($^4$He) generator (P-SC-ICAP-TRAMEGA-$^4$He) CAPGEN;

A maximal photovoltaic-space radiation energized-double canister-tramega and helium ($^4$He) generator (MP-SPRADEN-DCAN-TRAMEGA-$^4$He) CAPGEN.

A self-charging CAPGEN base capacitor architecture may include an inner capacitor sandwiched between two outer canister electrodes. Said canister electrode core cathode may contain an electron emitting radioisotope (not shown).

Advantage is achieved by attracting the core emitted beta particles (electrons) by a first electron attractor and adsorber encapsulating stratum—high-temperature resistant powder i.e. activated carbon, semiconductors and other electron attracting powder elements from the periodic table.

Simultaneously due to the core energetic photon emissions, some of the carbon powder stratum and air ionize and evolve additional secondary electrons. Additional advantages are achieved by adding a second stratum with a lower first ionization energy potential powder (requires less energy to be ionized than the first stratum) and encapsulates the activated carbon powder stratum.

Simultaneously additional electrons are evolved from the second stratum powder ionization.

Additional strata may be added with lower and lower first ionization energy potential and high temperature resistant powder elements from the periodic table down to barium (Ba).

Additional high temperature resistant compounds may also form additional strata.

More advantage is achieved from the internally generated heat by encapsulating all strata above in a thermionic electron emitter powder; i.e. semiconductors, germanium and other elements/compounds from the periodic table.

Encapsulating all strata above there is an outer activated carbon powder stratum to attract and store all inner evolved electrons.

All strata may be contained in an electron attractor and electron collector metal canister; i.e. selenium, germanium and other elements from the periodic table. Even more advantage may be gained by encapsulating all inner strata in a canister with the inner surfaces coated with a radiant emitting element-compound, i.e. thorium.

Still more advantage may be gained when the canister cathode electrode outer surface is coated with a modified photovoltaic activated carbonaceous powder and protected from the environment with a transparent film i.e. glass, polymers etc.

The modified exterior activated carbonaceous powder is made photon sensitive and energized by saturating the carbonaceous powder, in vacuum, with low first ionization energy potential powder elements and vapors i.e. lithium, cesium, etc. from the periodic table and by interspaceing electron emitters-radioactive particles within the activated carbonaceous powder. In addition the same CAPGEN described above, when located in space, may be charged by space ions and highly energetic cosmic rays.

A numerical constant in farads (F) per ion was established so that a CAPGEN or battery potential capacitance may be easily pre-designed and calculated (without experiments) based on the capacitor pressure, number of ionized atoms-molecules contained within the electrolyte and having at least a corresponding electrode carbonaceous surface area to adsorb all charges contained and evolved during the charging cycle.

BRIEF DESCRIPTION OF THE DRAWING

Drawing 1/1 is a section of a base capacitor architecture.

DETAILED DESCRIPTION OF THE INVENTION

Referring to Drawing1/1 a maximal modifiable modular capacitor-generator, (CAPGEN) base architecture (MMM-CAPGEN-BA) partially constitutes a solid, perforated dielectric or circumferential gasket separator 1, solid or perforated inner capacitor electrodes 2, outer metal or carbon fiber canister carbon electrodes with various inner and outer coatings 3, solid or perforated canister lids with conductive interior filter 4, a carbonaceous powder 5, conductive grids 6, washer-nuts 7, filters 8, nipples 9, electrical terminals-washers 10, caps 11, insulation 12 and exterior case 13 with various inner and outer coatings (not shown).

In order to achieve the multitask objectives of this invention and facilitate the CAPGEN construction phase, a new modifiable CAPGEN modular architecture was developed as follows:

In a first embodiment; a base capacitor architecture as described above may constitute;

(A) a dielectric material 1 such as a matrix of thermosetting or thermoplastic resin, epoxy glass, barium titanate (BaTiO$^3$), titanium dioxide (TiO$_2$) or other ceramic materials, polymers, mica, silicon, paper, gas or any dielectric material that meets pre-established voltage, and temperature parameters may be bonded between two inner electrodes 2 or the electrodes' 2 interior surfaces may be coated i.e. screen printing, with a dielectric film.

In the following example 1, two inner perforated metal electrodes 2 coated with a dielectric ceramic-polymer separator 1 forms an inner modular capacitor. The inner capacitor electrodes' material with a gold, silver, chromium, titanium, nickel etc. finish, may be copper, aluminum, steel, zinc, nickel, tantalum, titanium, tungsten, germanium or their alloys or conductive carbon fiber sheets may be used. The inner modular capacitor is baked between 30° and 600° C. to cure the adhesive. The inner capacitor is tested between 0-3000V for structural stability and quality. Thus an inner non-insulated perforated modular capacitor is formed.

(B) In a separate step, modular canister carbon electrodes constitute a metal, a conductive carbon fiber, or ceramic polymer canister 3 with a pre-drilled hole at the exterior surface, a washer and nut 7 is screwed and bonded to an exterior threaded tube (nipple) end 9, a perforated metal or perforated conductive carbon fiber plug with a conductive carbon or metal fabric filter bonded to the interior metal plug surface forms a plug-filter assembly 8, said plug-filter assembly 8 may be pressure fitted and glued into said nipple interior end 9 to retain the carbon powder 5 within the canister 3 but allows gases to flow through said nipple 9. The partial assembled nipple 9 is inserted through the internal canister 3 hole and may be welded with the exposed threaded nipple shaft on the canister 3 exterior.

An inner threaded metal washer with a tab that forms an electrical terminal-washer 10 surrounds the exterior nipple 9 and is bonded with conductive adhesive to the canister exterior base 3 and holds the nipple assembly intimately to canister 3. A cap 11 is loosely and partially screwed on the exposed threaded nipple end assembly 9, thereby a combination filter, electrical terminal, gas valve and cap is formed. The canister electrodes' internal and external surface 5 may be coated with an electron attractor or a radiant emitting source. Activated granular carbon 5 with 2500 $m^2/g$ or greater surface area and 0.5 g/cc average density is the preferred activated carbon purchasable material. The granular carbon is pulverized to obtain approximately 0.3 to 0.5 g/cc density, this low density assures that the carbon powder remains porous and each carbon particle will be accessed by electrolytes and charged; thereby the partially compacted activated carbon powder surface area remains substantially the same as the pre-pulverized activated granular carbon surface area. The large carbon porosity surface area assures that the number of gas atoms-molecules (electrolyte) contained within the canister 3 are maximized to approximate the number of carbon atoms-molecules, therefore more ions can be generated and stored at high temperature and voltage when the gas is rarefied and charged. The carbon powder may include low first ionization energy elements-compounds, semiconductors, electrolytes, radiant charged particles i.e. alpha, beta, gamma photons to increase internal electrical current, conductivity and reduce electrical resistance. The carbon powder is placed in and fills the canister 3 in one or multiple layers at a temperature between 20° to 100° C. or more. Each carbon powder layer is compacted with a ram pressure to obtain a preferred density of approximately 0.5 g/cc. Prior to installing the perforated canister lid 4, the canister temperature may be raised up to 1000° C. A perforated metal lid 4 with a bonded conductive filter on its interior surface (not shown), and with conductive adhesive on its peripheral edge and the same dimension as the inside thermally expanded canister diameter, is pressure fitted into the thermally expanded canister opening and encloses the canister 3.

The canister lid 4 adhesive is cured at 600° C. for approximately one hour and the temperature is then reduced to ambient temperature. As a result of the temperature reduction, the expanded metal canister 3 contracts and tightens the lid 4 thermally. Alternately, lid 4 and canister 3 may be threaded and screwed together (not shown). Thus a non-activated multi-purpose modular canister-carbon electrode 3 is formed. The modular non-activated carbon electrodes 3 are ready for activation and will be fully described and further modified in the following embodiments.

(C) The inner capacitor (A) described above may be sandwiched and bonded with conductive adhesive between two canisters-carbon electrodes 3 described in (B) above, cured between 20°-400° C. and compacted with a pressure up to approximately 20 $Kg/cm^2$. Thus a non-insulated capgen 14 with canister-carbon electrodes 3 is formed. Alternately, the inner dielectric separator 1 may be sandwiched directly between the canister-carbon electrodes 3 (not shown). The canisters-carbon electrodes 3 may be coated with a modified activated carbon electron emitting or alpha (gas) photon sensitive photovoltaic powder; the evolved gas may be collected by an external source.

(D) The non-insulated CAPGEN (C) is temporarily suspended inside an outer metal, silicon matrix, polymer or carbon fiber case 13 and the space between the non-insulated CAPGEN (C) and the outer case 13 is filled with high temperature insulation, i.e. ceramic-silicon polymers. Thus an insulated maximal base CAPGEN 14 architecture is formed and may be charged >3000V and from −300° C. to >1000° C.

In a second embodiment, an automatic temperature-pressure controlled Vacua-power capacitor (AT-PCV-VPCAP) is formed by modifying the first embodiment and coating the perforated canister carbon electrodes' surfaces with a ceramic-polymer dielectric, the canisters are bonded directly to each other (without the inner capacitor). The cathode electrodes' internal evolved ions may be increased by mixing the activated carbon powder with high temperature and low first ionization energy elements-compounds and semiconductor powders. Additionally, the cathode canister interior surface may be coated with beta ($^-$e) emitting radiation and the anode with alpha ($^4$He) emitting radiation. Also, caps 11 in the perforated modular canister carbon electrodes 3 described in (A) and (B) above may be replaced with a pressure gas relief valve (not shown) so that the working temperature and voltage may be maximized. The modular canister-carbon electrode 3 internal air, at STP, is thermally expanded and partially ejected through the gas relief valve and out of the canister-carbon electrode 3. The canister-carbon electrode 3 inner air is automatically rarefied in proportion to the rise in temperature—the higher the working temperature of the capacitor is, the more the electrode internal air becomes rarefied (electrically conductive) by V-POWER. Thus a carbon electrode 3 internal air is moderately and automatically self rarefied, below 760 Torr, modulated and activated thermally with a novel, economical and partial gaseous (air) electrolyte for maximal charge voltage in excess of 3,000 V and high temperature use of up to 1000° C. or higher.

In a third embodiment, a reticulated-capgen, (R-CAPGEN) with internal pressures at 760 Torr or higher is formed as follows; the canister's carbon electrodes 3 gas valves in the second embodiment are replaced with a cap: activated carbon powder 5 is placed in a modular canister 3, as described in (B) above, in one or multiple layers at temperatures between 0°-100° C. When modular canister 3 is assembled with multiple carbon layers, each layer is compacted to a density of approximately 0.1-0.5 g/cc. A reticulated electrical conductive or radioactivated grid 6 is placed on each carbon layer and compacted before the next carbon layer is deposited on said grid 6. Multiple layers are formed to obtain a predetermined internal electrical resistance. For example—in a 5 cm thick carbon electrode 3, metal grids 6 may be placed at 1 cm intervals so that the internal electrical resistance is minimized and approximates the electrical resistance of a 1 cm thick electrode. In this format and novelty with very little additional electrical resistance a carbon electrode thickness may be 2 cm, 20 cm, 100 cm thick or more. Thus the carbon electrode 3 internal electrical resistance is substantially reduced with electrically conductive reticulated grids. To increase the potential number of ions the internal pressure is increased to a predetermined pressure above 760 Torr. In addition, conventional compounds and elements with low first ionization energy elements from the periodic table may be mixed in various proportions with the activated carbon powder 5. More ions may be obtained by coating the canisters, interior and exterior surfaces with a radiant emitting source, i.e. thorium (Th).

In a fourth embodiment, a Selective-Vacua Power capacitor (S-V-P-CAP) is formed as follows; the MMM-CAP-GEN-B referring to FIG. 1/1 and the third embodiment above is further modified as follows; the canisters carbon electrodes' dielectric is replaced with a high temperature resistant ceramic-polymer circumferential gasket. The modular assembled capacitor 14 as shown in FIG. 1/1 may be self-electrically superactivated by permanently rarefying the canister carbon electrodes' 3 air thus making the rare gas highly electrically conductive by placing the assembled electrical terminal-washer 10 and gas valve cap 11 as described in (B) above in a vacuum chamber (not shown) that contains a rotating shaft-handle to tighten the loosely pre-assembled end cap 11 to the threaded nipple 9. A vacuum pump is connected to the vacuum chamber connector and the canister-carbon electrodes' 3 internal gas (air, already very low) may be rarefied to a pre-established pressure between 0.0001-760 TORR and made electrically conductive (ionized) to obtain a predetermined number of potential ions. The partially screwed nipple cap 11 is tightened sealing the rarefied gas canister activated carbon electrode 3. Thus the capacitor 14 internal electrical resistance is further selectively reduced and permanently superactivated electrically by the novel rarefied gaseous electrolyte V-POWER.

In a fifth embodiment, a Self Charging-Single Canister-Thermionic Radiant Maximal Electrical Generator and Adsorber (SC-SCAN-TRAMEGA) CAPGEN is formed by Totally Adsorbing Radiation Transformed Into Vital Electrical Energy (Tee), as follows:

Electrical energy is directly generated and stored within a canister carbon electrode 3, as described in (B), the first embodiment and the fourth embodiment above and modified as follows: in addition to V-power, electrical energy is directly generated from new electrolytes such as a radiation source: i.e. wasted nuclear fuels, radioisotopes, radioactive gases, concentrated solar energy, hot water geyser heat, motor vehicle's exhaust heat or any other radiant energy source by advancing the emitted radiation from the electrodes' 3 core through a multitude of various outer stratified circumferential powder materials, from the periodic table, with decreasing first ionization energy strata powders (powder levels with decreased energy required to ionize each additional outer stratum).

Each first low ionization energy stratum powder will have its own high surface area pulverized element or compound that is easily ionizable (electrolyzed), generates it's own charge and generally emits progressively additional lower energy secondary photons to ionize the next outer stratum.

When a radiation source is encapsulated within the canister 3, with a solid lid 4, core first stratum i.e. germanium, semi-conductors, silicon, graphite, activated carbon powder, etc. and the radiation source emits beta particles (electrons) and emits sufficient energetic photons (x-rays—gamma-rays) to facile ionize carbon and internal gases; i.e. isotope cesium137 ($^{137}Cs$) a common and abundant wasted nuclear isotope, then, an inner first powder; i.e. activated carbon powder 5, carbon has an affinity for electrons and moderates the core energy, may be used as the first stratum (shell) that circumferentially encapsulates and adsorbs the core emitted radiation. $^{137}Cs$, by decay, emits double beta particles (electrons), Ba137 and Ba137m1—and gamma rays. Since most metals and low first ionization energy elements-compounds from the periodic table need only a few eV to ionize, the emitted high voltage will ionize a large number of atoms-molecules/sec. Thereby increasing the electrical current output.

In addition to the electrons obtained by $^{137}Cs$ decay, the emitted core x-rays-gamma rays strike and ionize the carbon atoms—molecules, and the gaseous electrolyte; i.e. air or other stable or radiant gases between the carbon powder particles. Simultaneously additional secondary electrons and lower energy photons are emitted from the carbon ionization. The continuation of emitted electrons and some gamma rays from the core source, traverse the saturated carbon powder stratum away from the core. Encapsulating the core activated carbon powder stratum there is a second lower first ionization energy powder stratum (requires less energy to be ionized) such as calcium (Ca), alum (Al) indium (In) etc. This process of adding lower ionization energy powder strata with beta emitting particles may continue down the periodic table to Barium (Ba), the lowest first ionization energy level and relatively high temperature melting stable element or compound. However, high temperature melting compounds; i.e. barium oxide (BaO), lithium oxide (LiO), sodium oxide (NaO), lanthanum hexaboride ($LaB_6$), cerium hexaboride ($CeB_6$) etc. may form additional strata. Thus a significant amount of ionic current is generated.

Because these various strata generate a lot of heat-acids, alkaline and halogen elements-compounds are not practical to be used in this embodiment since they could become explosive. Therefore, when there are no more energetic photons generated by the various inner strata to ionize any additional outer strata from other elements-compounds, what is left is high temperature radiant heat. According to the "Manual of Roentgenological Technique" by L. R. Sante, when x-rays are formed, more than 99% of the generated radiation is in the form of high temperature heat, less than 1% is transformed into x-rays. It is advantageous to transform some of this residual heat directly into vital electrical energy as follows:

Semi-conductors, germanium (Ge), boron (Bo) silicon (Si), tungsten (W), etc. and their alloys profusely emit electrons by thermionic (heat) expansion from an extremely low temperature of 20° C. to over 1000° C., therefore germanium, silicon, tungsten, semi-conductors etc. powders may form the next electrical generating encapsulating strata.

Since the expected working temperature range from this embodiment is approximately between <−300°-1000° C. or more, depending on the core radiation energy level and mass, a substantial amount of electrical energy will be generated thermionically from these strata powder large surface area.

Encapsulating all of the above strata, there is an outer activated carbon powder stratum with a surface area of approximately 3000 m$^2$/g. The outer activated carbon powder adsorbs and stores all electrons generated from the various inner strata. The assembled strata are contained in a high electron affinity (attracts electrons) metal canister electrode 3 electron collector; i.e. germanium (Ge) etc. from the periodic table, thus a self-charged capgen electrode 3 cathode with terminal 10 as described in (B) above is formed. Additionally, a metal or carbon fiber canister electrodes' internal surface may be coated with a radiant emitting source, i.e. $^{210}$Pb. Thereby the core emitted radiation, is: 1. directly adsorbed, partially transformed and stored as electrical energy. 2. The outer core residual heat is directly adsorbed and simultaneously substantially transformed into electrical energy and stored. 3. The emitted subsequent outer core strata radiation and heat are also directly and proportionally converted into electrical energy and radiant heat. Therefore, a high temperature, self-charging, single canister thermionic radiant maximal electrical generator and adsorber (SC-SCAN-TRAMEGA) CAPGEN is formed.

In a sixth embodiment, a self-charging, double canister tramega and helium ($^4$He) generator (SC-DCAN-TRAMEGA $^4$He) CAPGEN is formed as follows: the single SC SCAN-TRAMEGA 4He capgen-canister electrode 3 described in the Fifth Embodiment above is modified by replacing the solid canister lid 4 with a perforated and filtered lid. The perforated lid 4 is bonded to a perforated dielectric separator 1 described in (A) and (B) above and forms a cathode.

A separate canister electrode 3 described in (B) above is bonded to the opposite dielectric separator 1 described above and forms the anode. The canister electrode 3 anode is modified and made positive (electrolyzed) in respect to the cathode by immersing the activated carbon powders 5 in an alpha emitting gas, i.e. radon (Rn) gas and or by encapsulating an alpha emitting radiant source, i.e. americium 241 ($^{241}$Am), polonium 216 ($^{216}$Po) etc. within the anode core of the activated carbon powder 5.

Alpha particles are high energy positive charges (helium gas [$^4$H] protons) that greatly contribute to high electrical current and capacitance by radiantly separating positive and negative charges by attracting negative ions from the cathode through the perforated dielectric separator 1 described in (A) above and through the outer electrical circuit terminal 10.

The canister electrode 3 anode evolved internal $^4$He gas is partially adsorbed by the activated carbon powder, but mostly is ejected out of the anode metal canister 3 by replacing cap 11 described in (B) above with a gas relief valve; the ejected gas also reduces the CAPGEN internal pressure and may be collected. Also, the electrode 3 internal surface may be coated with a radiant emitting source, i.e. thorium, $^{210}$Bi. Additionally, the CAPGEN described herein may be rapidly charged by an external source to maximize the overall electromotive potential.

In a seventh embodiment, a photovoltaic-selfcharging-inner capacitor tramega and helium ($^4$He) generator (β-SC-ICAP-TRAMEGA-$^4$He) CAPGEN of the first embodiment constitutes: a high temperature resistant dielectric solid separator 1; i.e. ceramic, mica, polymers, silicon or their composition etc., is bonded between two solid inner metal or conductive carbon fiber electrodes 2, cathode and anode, and forms an inner capacitor as described in the first embodiment (A) above. Separately, 1. The cathode is further modified and activated as follows: Activated carbon powder is placed in a vacuum chamber and forms a scaffold. A low ionization energy electrolyte vapor, i.e. lithium (Li), sodium (Na) or compounds etc., is introduced into the vacuum chamber and adsorbed by the activated carbon powder and forms a composite photovoltaic photon adsorber and electron emitter carbon powder with extremely large surface area. 2. The composite photovoltaic carbon powder 1 above may be mixed with a thermionic sensitive electron emitter semiconductor powder i.e. Ge and/or with an electron emitter radioisotope; i.e. $^{48}$Ca, barium oxide (BaO) etc. powder to form a unitary photovoltaic self-charging cathode powder. A layer of the unitary cathode powder is deposited on the exposed electrode 2 cathode surface and is thereafter encapsulated in a protective transparent coating; i.e. glass, polymers etc. Thus a SC-ICAP-TRAMEGA cathode is formed.

The anode is further modified as follows: 1. Separately, activated carbon powder is placed in a vacuum chamber and forms a scaffold. A high electron affinity element-compound i.e., fluorine (F), chlorine (Cl), an acid vapor, radon gas (an alpha particle emitter) etc., is introduced into the vacuum chamber and adsorbed by the activated carbon powder to form a positive composite electron attractor powder with extremely large surface area. 3. A positive charge emitter radioisotope; i.e. $^{241}$Am powder, emits a continuous supply of protons (positive ions—an alpha particle emitter and helium $^4$He gas) and may be mixed with the above composite electron adsorber powder to form a unitary electron attractor and self-charging anode powder. A layer of the unitary self-charging and electron attractor anode powder is deposited on the exposed anode electrode 2 surface only and is thereafter encapsulated in a protective transparent coating; i.e. glass, polymers, etc. all the anode edges are vented and coated with a porous bead, i.e. ceramic so that the internal evolved $^4$He gas may be collected and stored within a circumferential tubular radiation resistant structural compound, i.e. lead (Pb) particles impregnated ceramic-carbon fibers (not shown). In addition the CAPGEN above may be charged by an external source.

Credo that most of the universe energy (V power) that surrounds us and impossible to escape from, is contained in space vacua. Therefore, it is advantageous to adsorb, gratis, space radiation, transform it into electrical energy and simultaneously store it as follows;

In an eighth embodiment, a maximal photovoltaic-space radiation energized-double canister-tramega and helium ($^4$He) generator (MP-SPRADEN-DCAN-TRAMEGA-$^4$He) CAPGEN of embodiments 6 and 7 are modified as follows; the cathode canister electrodes' 3 uncoated and exposed nonconductive surfaces of the sixth embodiment is coated with a photovoltaic self charging electron emitter unitary cathode powder, and protected with a transparent protective coating as described in the seventh embodiment above. Separately, the canister electrode 3 anode uncoated and exposed surface is also modified and coated with a unitary self-charging and electron attractor anode powder and protected with a transparent coating as described in the seventh embodiment above. Electrical energy may be transformed, transmitted, retransformed, adsorbed and stored economically, long distances and wirelessly as follows: energy from a source; i.e. the sun or space photons, a nuclear power plant, or from the fourth, fifth, sixth or seventh embodiment described above, is transformed into concentrated unidirectional photons, a laser, masor, pulse beam (x-rays) etc. When said photons are incident on the eighth embodiment—MP-SPRADEN-DCAN-TRAMEGA $^4$He CAPGEN carbon powder surface described above, the photons energy is adsorbed by the external unitary photovoltaic and self-charging carbon powder and maximally ionized. Electrical energy is generated both from internally evolved photons and external adsorbed photons and stored simultaneously by the large electrode 3 external and internal carbon powder surface area.

For example, a target such as an electric airplane, or space satellite etc., that is equipped with an eighth embodiment MP-SPRADEN-DCAN-TRAMEGA $^4$He CAPGEN, as described above, needs to be maximally charged, and concentrated photons from the sun or a ground source or secondary airplane equipped with a unidirectional (laser) photon transmitter are focused on the subject target and incident on the MP-SPRADEN-DCAN-TRAMEGA $^4$He CAPGEN cathode carbon surface (receiver), the electrode 3 is rapidly charged from external and internal sources as described above. Also, when the same airplane or satellite is positioned within or above the ionosphere stratum-approximately 50+ kilometers above the earth's surface, conventional electrolytes used in the eighth embodiment above may not be necessary since the canister electrodes' 3 inner carbon powder 5 interspatial gas (air) is automatically rarefied and ionized by space vacua power when the canister electrodes 3 caps 11 are removed. The electrode's 3 inner air is automatically ejected out by space V power and the internal and external carbon powder 5 are charged with a continuous supply of ionospheric ions and space cosmic rays; i.e. positive and negative cosmic particles (extremely energetic protons, alpha particles and heavier particles). Thus beside visual photons, a limitless amount of (non-visible) space spectra radiation will be adsorbed, transformed and stored as electrical energy and evolved $^4$He gas from V power; in addition the CAPGEN above may be charged by an external source.

According to the literature, the dielectric strength (sparking voltage) of air at standard temperature and pressure (STP) (760 TORR) is about 3000 V/mm.

When air is rarefied, ions-electric current evolve and the air becomes partially electrically conductive. Electrical conductivity increases until a pressure of approximately 0.1 TORR is reached, at this pressure the sparking voltage is approximately 350 V.

If the gas is rarefied even more, due to fewer ions, suddenly there is a sharp increase in the sparking voltage. Therefore, when this new gaseous electrolyte is used in a capacitor or battery, the charging voltage, current and internal electrical resistance may be selected and optimized by evaluating:

The rarefied gaseous pressure.
The separation distance between the electrodes.
Internal air volume (number of molecules) to be ionized.
The shape and types of electrodes (electrical conductivity, temperature, resistance etc.).
Types of additional gases used as electrolyte i.e. radon gas, noble gases, alkali vapors etc.

With the proper selection of materials and, due to VACUA POWER and radiant (radioisotopes) emissions, the higher the working temperature is, the more efficient the CAPGEN becomes. Also with higher temperature the carbon-graphite-graphene electrical conductivity increases and electrical resistance decreases.

Table 1 compares various values for compacted activated carbon powder electrodes immersed in sulfuric acid ($H_2SO_4$) described in U.S. Pat. No. 6,353,528B1 Example 2 Table 4 versus the present invention, a base capacitor architecture of Example 1 comprising activated carbon powder (mildly compacted) immersed in rarefied gas (air). The capacitance in farads for the present invention is derived from (a new constant) the proportions and number of molecules-ions (charges) developed from each electrode electrolyte and adsorbed by the activated carbon powder based on the activated carbon powder working surface area.

Constant

It is a novelty of this invention that a new method (a constant) to calculate the capacitance of a capacitor-battery (CAPBAT) or CAPGEN has been established based on (1) the number of atoms-molecules (ions) contained in the electrolyte between the electrodes; (2) a sufficient electrode surface area to adsorb all ions.

Based on my analysis, the fundamental electrochemical charge (constant) of an ionized single atom-molecule and Totally Adsorb Radiation Transformed Into Vital electrical energy (Tee), without a catalyst is approximated.

Constant Tee=$32 \times 10^{-21}$±Farad or coulomb/molecule/volt.

For the "constant" derivation see Table 1, number 11[D] farad/molecule.

TABLE 1

| Number | U.S. Pat. No. 6,353,528B1 Example 2 Table 4 | Present Invention Example 1 |
|---|---|---|
| 1. Electrode size | 3.5 cm$^3$ | 500 cm$^3$ |
| 2. Activated Carbon compaction | 3000 PSI | 0-7 kg/cm$^2$ |
| 3. Activated carbon surface area | Before compaction 2000 m$^2$/g (av.) | Before compaction 2500 m$^2$/g |
| 4. Activated carbon surface area | After compaction 1584.2 m$^2$/g (av.) | After compaction 2500 m$^2$/g |
| 5. Charging temperature | Up to 50° C. (estimated) | up to 1000° C. (variable) |
| 6. Charging pressure | 760 TORR | 10 TORR (variable) |
| 7. Charging voltage | 0.9 V | 1400 V (variable) |
| 8. Electrolyte | Sulfuric acid ($H_2SO_4$) | Gas (air) (variable) |
| 9. Capacitance (C) in Farads/g (F/g) | 69.4 F/g (av.) [A] | [see 14] |
| 10. Molecules/cm$^3$/g (electrolyte) | $2.1559 \times 10^{21}$ ($H_2SO_4$) [B] | $2.6884 \times 10^{17}$ [C] (Rarefied Air) |
| 11. F/molecule (constant) | $32.19 \times 10^{-21}$ ($H_2SO_4$) [D] | |
| 12. F/cm$^3$ @ 10 TORR | | $86.539596 \times 10^{-4}$ (AIR) [E] |
| 13. F/500 cm$^3$/electrode @ 1584.2 m$^2$/g | | 4.32698 F [F] |
| 14. F/electrode @ 2500 m$^2$/g | | 6.8283673 F [G] |

[A] Five best samples 1, 2, 3, 9, 10.
[B] $H_2SO_4$ @ 29.9% solution (calculated) = $2.1559 \times 10^{21}$ molecules/cm$^3$
[C] Air = 78% Nitrogen, 21% Oxygen, 1% Argon (calculated)
at STP = $2.6884 \times 10^{19}$ molecules/cm$^3$
at 10 TORR = $2.6884 \times 10^{17}$ molecules/cm$^3$ (approximately).
[D] F/molecule = 69.4 F/g ÷ $2.1559 \times 10^{21}$ molecules/cm$^3$/g = $32.19 \times 10^{-21}$ F/molecule
[E] Rarefied air @ 10 TORR = $2.6884 \times 10^{17}$ molecules/cm$^3$ $\times$ $32.19 \times 10^{-21}$ F/molecule = $86.539596 \times 10^{-4}$ F/cm$^3$.
[F] F/500 cm$^3$/eletrode = 500 cm$^3$ $\times$ $86.539596 \times 10^{-4}$ F/cm$^3$ = 4.32698 F. Based on activated carbon @ 1584.2 m$^2$/g surface area.
[G] F/500 cm$^3$/eletrode based on activated carbon @ 2500 m$^2$/g surface area =

$$\frac{4.32698 \text{ F} \times 2500 \text{ m}^2/\text{g}}{1584.2 \text{ m}^2/\text{g}} = 6.8283673 \text{ F}$$

Example 1

One of the fundamental and exemplary base capacitors architecture as described in the first embodiment above and further described herein has the following attributes: contains an inner capacitor (A) with a perforated ceramic separator 1 sandwiched between two inner perforated metal electrodes 2 that are bonded between two perforated metal-filtered canister carbon electrodes 3 as described therein in (A) and (B). Each canister 3 electrode contains 500 g of activated carbon powder 5 with 2500 m²/g surface area, the interior canister carbon electrodes 3 are reticulated with metal grids 6 (the same material as canister 3) and compacted at 1 cm intervals from 0-20 Kg/cm². Thereafter, the capacitor interior air is rarefied (electrolyzed) to approximately 10 TORR to obtain maximal internal electrical conductivity and minimal internal electrical resistance at high voltage. The total capacitor weight is approximately 3 kg or 7.6 lbs. The capacitor described herein is charged arbitrarily from 0 to 1400 volts.

As shown in Table 1, Number 14, the capacitance C shown in Farads (F) for an electrode with 500 grams of activated carbon and 2500 m2/g surface area equals 6.8283673 F. According to the formula to store electrical energy in a capacitor—the energy density in Watt-hour (Wh) equals:

$E=CV^2/2\times3600$ where C equals capacitance in Farads (F); V equals voltage. 3600 is the number of seconds per hour.

At 1400 V. the energy density/capacitor equals:

$E=6.8283673$ F$\times(1400)^2$V/2$\times3600$ s=1,858.83 Wh/capacitor.

According to U.S. Pat. No. 7,466,536B1 it takes 10,444 wh to drive an electric car at 60 mph for one hour. To drive an electric car 500 miles at 60 mph it takes: 500 mi/60 mph×10,444 Wh=87,033.3 Wh.

The number of capacitors (as described above) required to store 87,033.3 Wh equals 87,033.3 Wh-:-1,858.83 Wh/capacitor=46.83 or 47 capacitors equal to approximately 141 Kg or 319 lbs.

For comparison, a 4000 pound automobile with a gasoline engine averages about 25 mpg, to travel 500 miles, without refueling, the automobile must have a filled 20 gallon gasoline tank. The total weight for 20 gallons of gasoline, fuel tank, supporting brackets, fuel supply line, fuel cap-door enclosure, fuel injection system, exhaust system, alternator, battery, etc. totals in excess of 350 pounds. Thereby the energy density/lb (kg). of the exemplary capacitor surpasses the energy density of gasoline (when used in an automobile gasoline engine).

It must be noted that the capacitor electrodes' activated carbon mass may be increased to increase the electrode surface area and ions or the voltage may be increased to increase the energy density or the capacitance and charges may be increased by adding within the carbon electrodes alpha, beta and x-rays-gamma rays emitting radioisotopes-radioactive gases as additional self procreating electrolytes. In addition the electrodes may be modified by substituting the rarefied air gas with neutral (noble) and radioactive gases, thus the charging voltage may be increased above 3000v, thus forming a maximal CAPGEN.

I claim:

1. A maximal modifiable modular capacitor, comprising:
    an outer canister having a major axis running from an upper end of the outer canister to a lower end of the outer canister;
    an inner capacitor disposed within the outer canister, the inner capacitor comprising:
        a first perforated electrode having an upper major surface and a lower major surface, the first perforated electrode oriented to have the upper major surface and the lower major surface substantially perpendicular to the major axis of the outer canister;
        a second perforated electrode having an upper major surface and a lower major surface, the second perforated electrode oriented:
            to have the upper major surface and the lower major surface substantially perpendicular to the major axis of the outer canister; and
            to have the upper major surface of the second perforated electrode facing the lower major surface of the first perforated electrode;
        a dielectric separator disposed between the first and second perforated electrode and bonded to at least one of the first and second perforated electrode;
        a first perforated and filtered carbon electrode concavely coupled to the first perforated electrode; and
        a second perforated and filtered carbon electrode concavely coupled to the second perforated electrode,
        wherein the maximal modifiable modular capacitor is formed across the first and second perforated and filtered carbon electrodes.

2. The maximal modifiable modular capacitor of claim 1, wherein the outer canister includes an opening between an interior and an exterior of the outer canister, the maximal modifiable modular capacitor further comprising an outer-threaded nipple tube inserted through the opening, the nipple tube comprising an inner end disposed inside the outer canister, and an outer end disposed outside the outer canister.

3. The maximal modifiable modular capacitor of claim 2, wherein the nipple tube is fastened to the outer canister, the maximal modifiable modular capacitor further comprising a plug-filter assembly coupled to the inner end of the nipple tube, the plug-filter assembly comprising a perforated conductive plug and a filter.

4. The maximal modifiable modular capacitor of claim 2, wherein the outer end of the nipple tube comprises a threaded exterior coupled to the outer canister by use of an interior-threaded electrical terminal-washer.

5. The maximal modifiable modular capacitor of claim 2, further comprising a cap coupled to the outer end of the nipple tube, and the cap is coupled to the outer canister.

6. The maximal modifiable modular capacitor of claim 5, wherein the cap comprises a gas relief valve.

7. The maximal modifiable modular capacitor of claim 2, wherein the nipple tube is welded to the outer canister.

8. The maximal modifiable modular capacitor of claim 2, wherein the nipple tube is thermally pressure fitted to the outer canister.

9. The maximal modifiable modular capacitor of claim 1, wherein the outer canister encloses a carbonaceous powder selected from a group consisting of activated carbon powder, graphene and carbon fibers, wherein the carbonaceous powder is compacted in one or more layers.

10. The maximal modifiable modular capacitor of claim 9, wherein the carbonaceous powder retains substantially unchanged porosity and surface area when compacted.

11. The maximal modifiable modular capacitor of claim 1, further comprising a perforated and filtered conductive lid configured to enclose the outer canister, the lid comprising one of a metal material and a carbon fiber material, the lid coupled to the outer canister by an attachment mechanism selected from a group consisting of a thermal pressure fitting, a conductive adhesive bonding, and a screw-thread.

12. The maximal modifiable modular capacitor of claim 1, wherein the outer canister encloses an electrolyte.

13. The maximal modifiable modular capacitor of claim 1, wherein the outer canister encloses a gaseous electrolyte.

14. The maximal modifiable modular capacitor of claim 1, wherein a gap between the outer canister and the inner capacitor encloses an insulator.

* * * * *